(12) United States Patent
Captarencu et al.

(10) Patent No.: US 9,964,407 B2
(45) Date of Patent: May 8, 2018

(54) LEVELING DEVICE

(71) Applicant: Klein Tools, Inc., Lincolnshire, IL (US)

(72) Inventors: Catalin V. Captarencu, Lake Zurich, IL (US); David W. Mueller, Lake Zurich, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 118 days.

(21) Appl. No.: 15/205,565

(22) Filed: Jul. 8, 2016

(65) Prior Publication Data

US 2018/0010912 A1    Jan. 11, 2018

(51) Int. Cl.
*G01C 9/28* (2006.01)
*G01C 9/34* (2006.01)

(52) U.S. Cl.
CPC ...................................... *G01C 9/34* (2013.01)

(58) Field of Classification Search
CPC ....................................................... G01C 9/28
USPC ........................... 33/347, 370, 371, 379–390
See application file for complete search history.

(56) References Cited

U.S. PATENT DOCUMENTS

| | | | | |
|---|---|---|---|---|
| 3,832,782 A * | 9/1974 | Johnson | ................... | G01C 9/28 33/351 |
| 5,755,623 A * | 5/1998 | Mizenko | ............ | A63B 69/3685 33/384 |
| 7,117,606 B2 * | 10/2006 | Brown | ...................... | G01C 9/28 33/365 |
| 8,484,856 B1 * | 7/2013 | Webb | ....................... | G01C 9/26 33/371 |
| 2008/0301957 A1 * | 12/2008 | Vernola | ..................... | G01C 9/28 33/371 |
| 2010/0115781 A1 * | 5/2010 | Norelli | ..................... | G01C 9/28 33/371 |
| 2011/0138642 A1 * | 6/2011 | Norelli | ..................... | G01C 9/28 33/371 |
| 2013/0269196 A1 * | 10/2013 | Steele | ...................... | H02G 1/00 33/379 |
| 2016/0054124 A1 * | 2/2016 | Schaefer | .................. | G01C 9/32 33/354 |
| 2016/0138918 A1 * | 5/2016 | Neitzell | ................... | G01C 9/34 33/381 |

* cited by examiner

*Primary Examiner* — G. Bradley Bennett
(74) *Attorney, Agent, or Firm* — Leydig, Voit & Mayer, Ltd.

(57) ABSTRACT

A leveling device having at least one opening that houses a leveling vial and having a channel formed from a working surface, where at least one magnet and at least one spacer are retained in the channel.

20 Claims, 8 Drawing Sheets

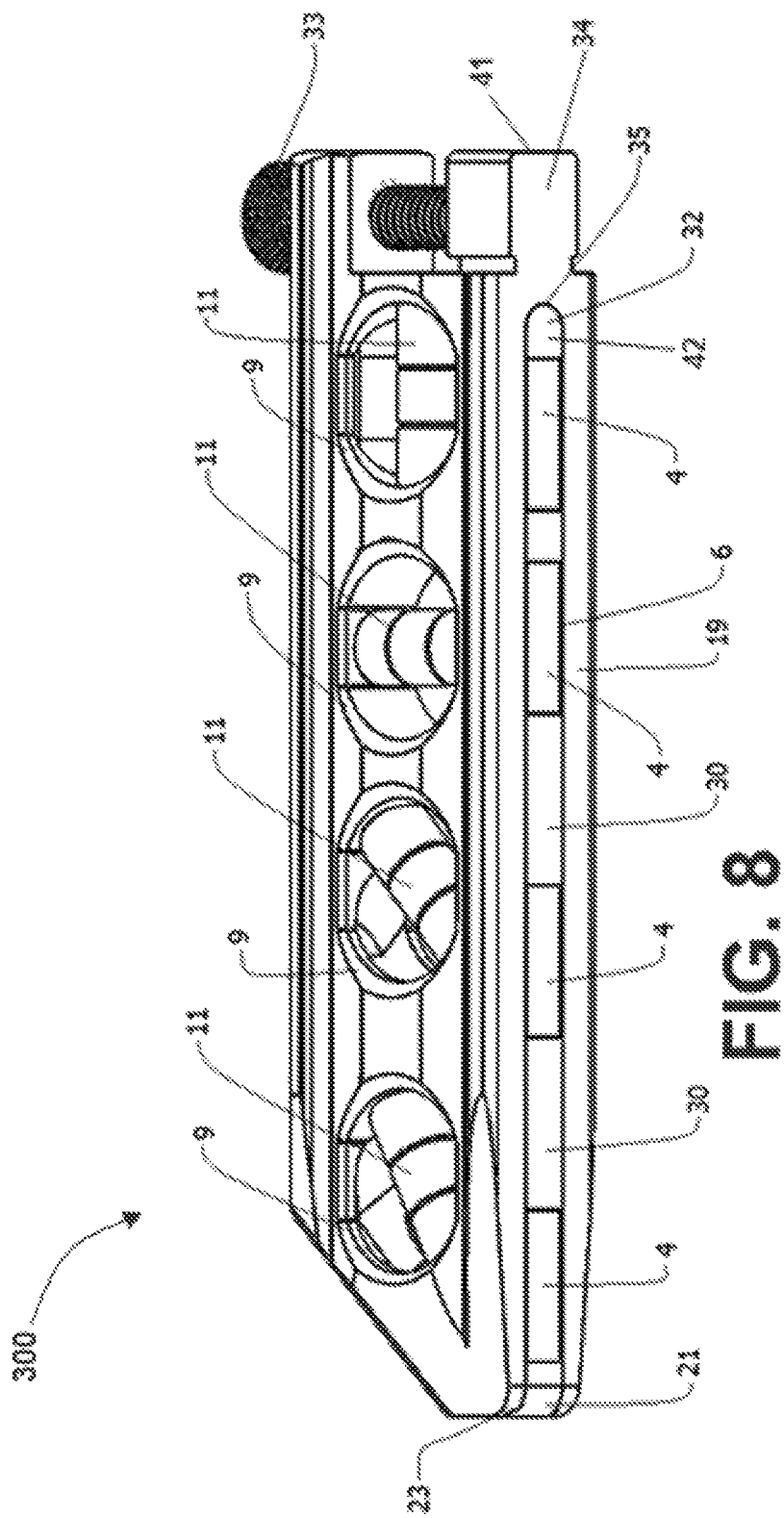

LEVELING DEVICE

TECHNICAL FIELD

This disclosure relates generally to levels and, more particularly, to torpedo levels.

BACKGROUND

This disclosure relates to levels, and particularly to torpedo levels used by electricians and other tradesmen for leveling conduits, pipes, rods and construction items to ensure that such structures are plumb and level. Torpedo levels are typically made out of extruded metal that forms two spaced parallel work surfaces and a perpendicular body in which one or more holes are formed to receive the ends of spirit level vials. Because pipes, conduits, rods and other devices are made of ferrous materials, magnetic torpedo levels may adhere to these surfaces when in use.

U.S. Pat. No. 3,213,545 to Wright discloses a typical magnetic leveling device in the prior art. The leveling device disclosed in the Wright patent forms a slot along the length of one working surface in which an elongated magnet with multiple alternating poles, commonly called a "strip magnet," is affixed. Magnetic leveling devices of this type were ubiquitous in the construction trade until the advent of readily accessible rare earth magnets. Strip magnets, however, are not particularly strong and may typically not hold the level with sufficient strength to the object it is connected to.

U.S. Pat. No. 7,520,065 to Vernola discloses a method of affixing neodymium or "rare earth" magnets to a leveling device. In this type of leveling device, circular, rare earth magnets are press-fitted into circular holes in the body of the leveling device, and rely on friction and pressure between the body of the leveling device and the magnet, and optionally an adhesive, to retain the magnets. Rare earth magnets may dislodge from the body of the magnet or shatter, typically as a result of impact when the leveling device is dropped.

U.S. Pat. No. 7,552,540 to Wu discloses a leveling device with magnets in magnet carriers that can be inserted into grooves formed in an interior portion of the body of the device. This type of leveling device allows for the use of the same body for both a magnetic and nonmagnets version of the same level. However, because the magnets are housed away from the working surface of the leveling device, they exert less magnetic force upon the workpiece. The mechanism, as disclosed in Wu, is difficult to implement in a torpedo level, which is constructed of extruded metal, precluding the interior magnet slots.

SUMMARY

In one aspect, the disclosure describes a leveling device includes a body having an elongated shape and forming at least one opening extending transversely or an angle relative to a longitudinal axis of the body. In one exemplary embodiment, the at least one opening extends from a left side of the body to a right side of the body. A leveling vial is disposed in the opening. The body forms a working surface, the working surface including a channel therein extending from one end of the body towards the other end of the body along a working surface of the body and in parallel to the longitudinal axis of the body. The channel contains a plurality of magnets and at least one spacer. The plurality of magnets are held substantially flush with the working surface. In one exemplary embodiment, the spacer is formed as a rail having pockets, into which pockets the magnets are retained by inclined surfaces.

In another aspect, a leveling device includes a body having an elongated shape, a working surface, and at least one opening. A leveling vial is disposed in the opening. The working surface includes a channel therein extending from a front end of the body towards a rear end of the body. The channel contains at least one magnet, with the at least one magnet held substantially flush with the working surface. The rear end of the body includes both a bolt and an anvil.

BRIEF DESCRIPTION OF THE DRAWINGS

FIG. 8 is another embodiment of a magnetic leveling device in accordance with the disclosure.

DETAILED DESCRIPTION

Figure 1:
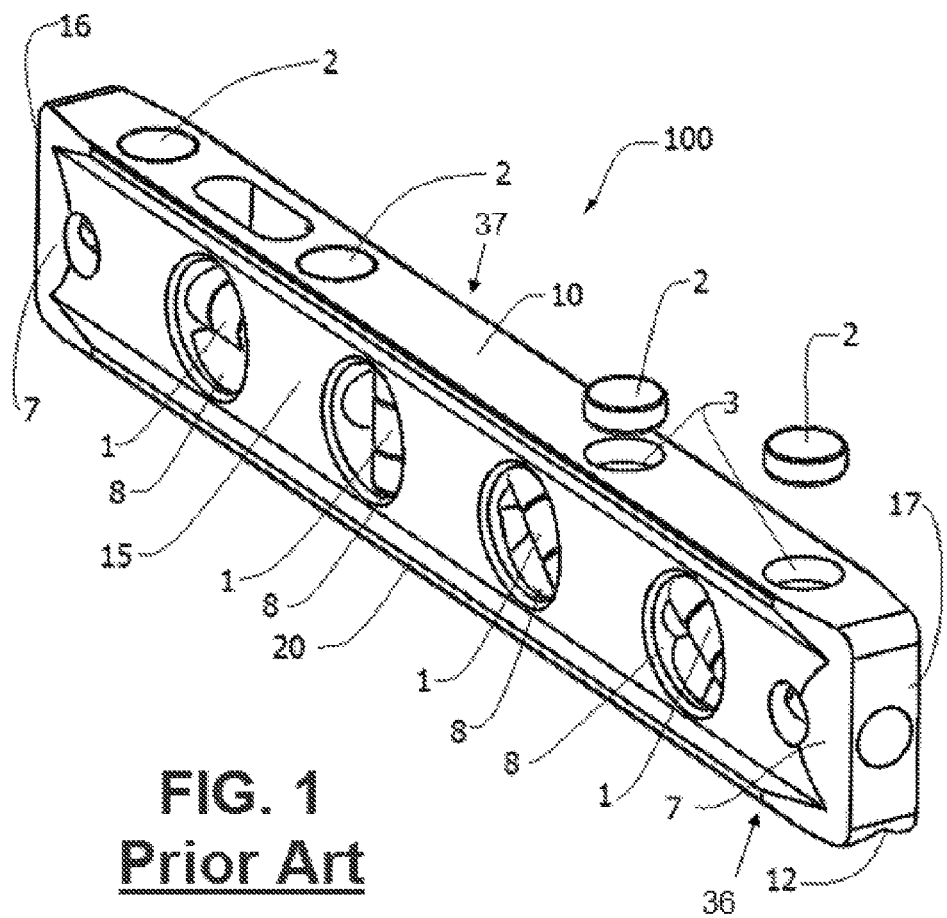
FIG. 1 is a perspective view of a prior art magnetic leveling device.

The present disclosure is applicable to retention of magnets into a working tool. In the illustrated embodiment, the tool is an extruded metal piece formed as a torpedo level. FIG. 1 depicts a magnetic torpedo leveling device 100 common in the prior art. The body 15 of this magnetic torpedo leveling device 100 is formed entirely from a single piece of extruded material, such that a cross section of the magnetic torpedo leveling device 100 at any point along its cross section from a front end 16 to a rear end 17 is substantially identical, with the exception of a beveling 7 performed by machining away material at the front end 16 and rear end 17 of the magnetic torpedo leveling device 100. The magnetic torpedo leveling device 100 includes a top working surface 20 and a bottom working surface 10, a left side 36, and a right side 37. The magnetic torpedo leveling device 100 forms openings, or viewing windows 8, through the body 15 from the left side 36 to the right side 37. Spirit leveling vials 1 are located in the viewing windows 8 at premeasured angles to both the top working surface 20 and the bottom working surface 10, allowing a user of the magnetic torpedo leveling device 100 to take leveling measurements when the torpedo leveling device 100 is connected to a surface whose angle is to be measured. This particular magnetic torpedo leveling device 100 features circular rare earth magnets 2, which are press-fitted into circular recesses 3 in the bottom working surface 10 of the magnetic torpedo leveling device 100. A small amount of glue may be used within the circular recesses 3 to hold the circular rare earth magnets 2 in place. The magnetic torpedo leveling device 100 forms a groove 12 in the top working surface 20 of the magnetic torpedo leveling device 100 designed to accommodate pipes, conduit, or other circular surfaces.

Figure 2:
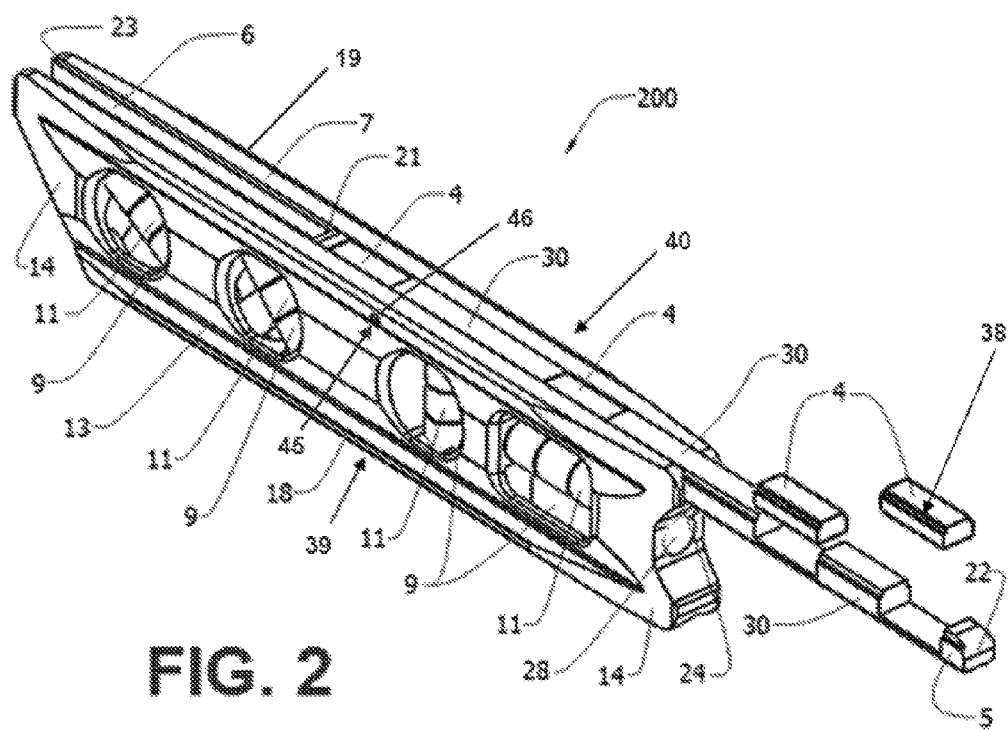
FIG. 2 is a perspective breakout view of a magnetic leveling device in accordance with the disclosure.
Figure 3:
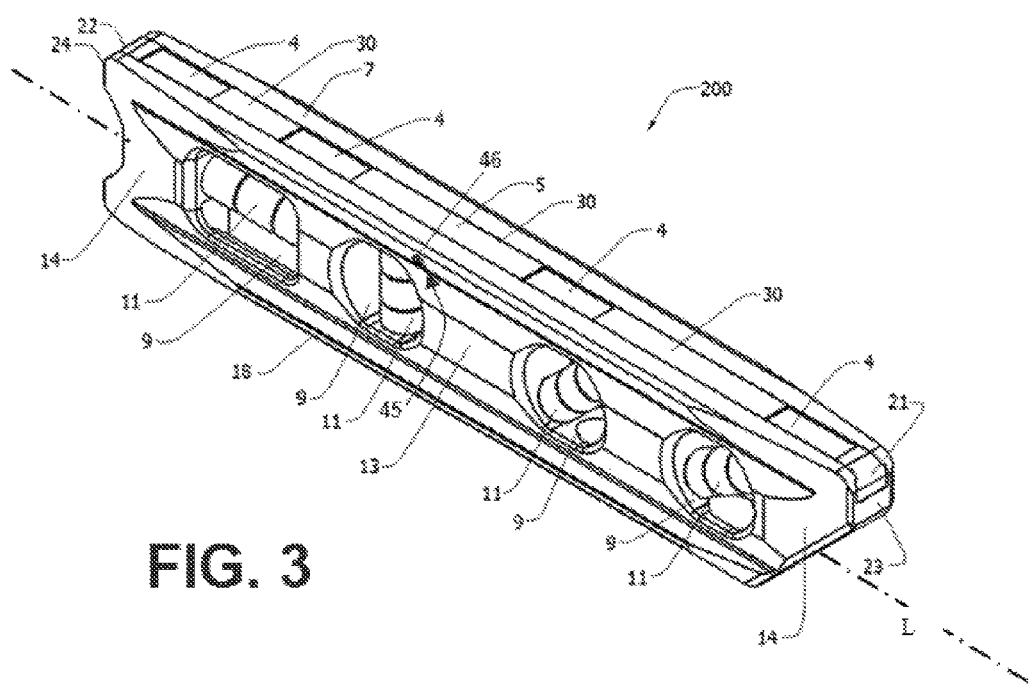
FIG. 3 is a perspective view of an assembled magnetic leveling device in accordance with the disclosure.

FIG. 2 depicts a leveling device 200 in accordance with the present disclosure in a partially broken out view, and FIG. 3 depicts the leveling device 200 in an assembled view. The leveling device 200 is formed as a body 13 of extruded material with beveling 14 tapering the profile of the body 13 near both a front face 23 and a rear face 24 of the body 13 with respect to a longitudinal axis, L, of the body 13. The body 13 forms viewing windows 9, or openings, extending from a left side 39 of the body 13 to a right side 40 of the body 13. All of the viewing windows 9 may be the same size, or alternatively, different sizes. The body 13 also forms leveling vial insertion holes 28 or bores configured to allow for the insertion of leveling vials 11 and for the viewing of leveling vials 11 from the viewing windows 9. The leveling vials 11 in an embodiment are partially filled with spirit oil or alcohol, leaving a bubble, such that the leveling vials 11 are located in the viewing windows 9 at premeasured angles to a top working surface 18 and a bottom working surface 19 to allow a user to take leveling measurements.

Figure 4:
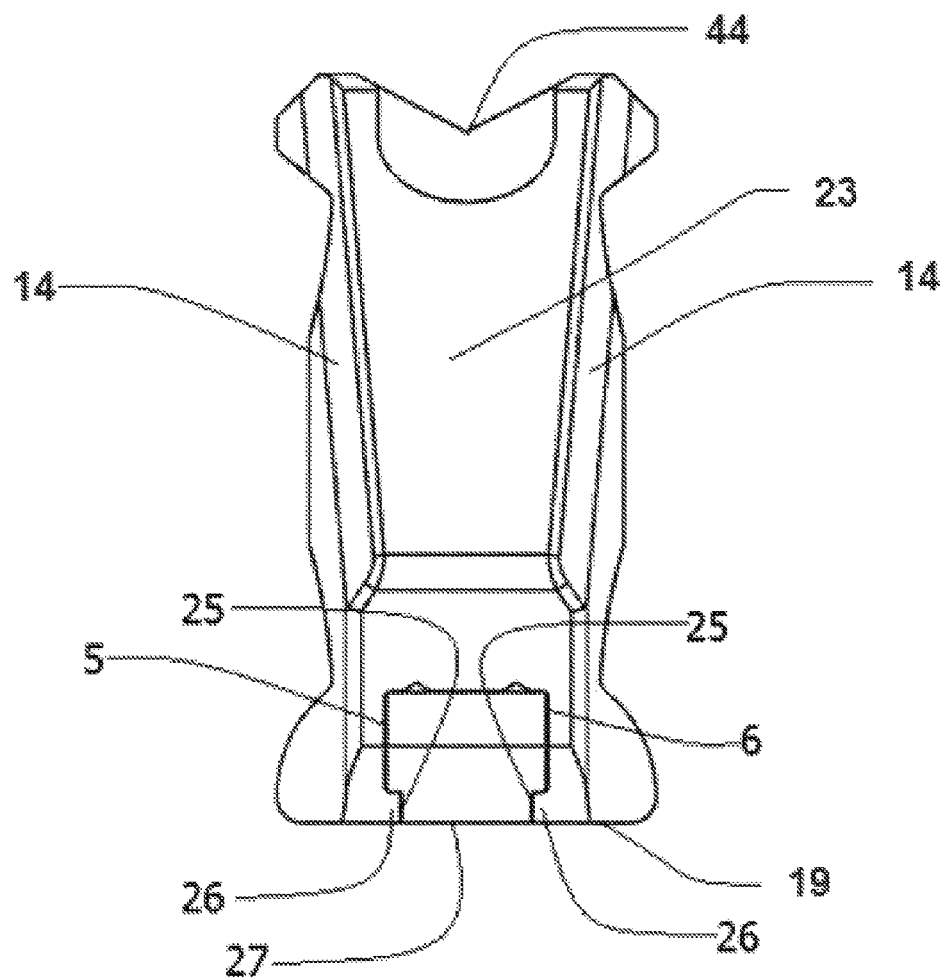
FIG. 4 is an end view of a magnetic leveling device in accordance with the disclosure.

As can also be seen in the end view of FIG. 4, the leveling device 200 forms a channel 6 in the body 13 adjacent the bottom working surface 19. The channel 6 extends into the body 13 and along the length of the body 13, as least partially, along the longitudinal axis L. In the illustrated embodiment, the channel 6 runs along the length of leveling device 200 from the front face 23 to the rear face 24. Rare earth magnets 4 are shaped to conform to the contours of the channel 6 of the leveling device 200. The rare earth magnets 4 are spaced apart at a predetermined distance by spacers 30, the spacers also configured to be insertable into the channel 6. In operation, the rare earth magnets 4 and the spacers 30 may be placed on a magnet carrier 5, and then the entire assembly may be inserted into the channel 6. Alternatively, the rare earth magnets 4 and the spacers 30 may be inserted into the channel 6 individually. As shown in FIG. 2, each magnet 4 is generally shaped as a rectangular cuboid having two of its upper edges 38 that extend parallel to the longitudinal axis L chamfered, or indented, to provide engagement of the magnet 4 into the channel 6 and retention against the magnet falling out of the channel 6 from the open, top end of the channel. The body 13 may form an opening 45 from the left side 39 of the body extending into the channel 6. The opening 45 is configured to accommodate a pin 46 to hold the magnet carrier 5 in place.

As seen in FIG. 3, when the leveling device 200 is fully assembled, a front most spacer 21 is flush with the front face 23, and a rearmost spacer 22 of the magnet carrier 5 is flush with the rear face 24 of the leveling device 200. Tolerances between the rare earth magnets 4 and the spacers 30 and the channel 6 are ideally tight enough that the assembly holds together on its own. Alternatively, a small amount of adhesive may be used in the channel 6 between the magnet carrier 5 and the body 13 for added permanency.

FIG. 4 depicts a front end view of the leveling device 200. In this embodiment, the channel 6 forms a "T" shaped cross section. Indents 25 in both the rare earth magnets 4 (see FIG. 2) and the magnet carrier 5 conform to protruding lips 26 of the channel 6 in the bottom working surface 19 to form the "T" shaped cross section. A bottom surface 27 of the magnet carrier 5 is flush with the bottom working surface 19 of the leveling device 200. The rare earth magnets 4 may be very slightly recessed from both the bottom surface 27 of the magnet carrier 5 and the bottom working surface 19 of the leveling device 200. The top working surface 19 may include a groove 44 configured to accommodate pipes, conduit, or other circular surfaces.

Figure 5:
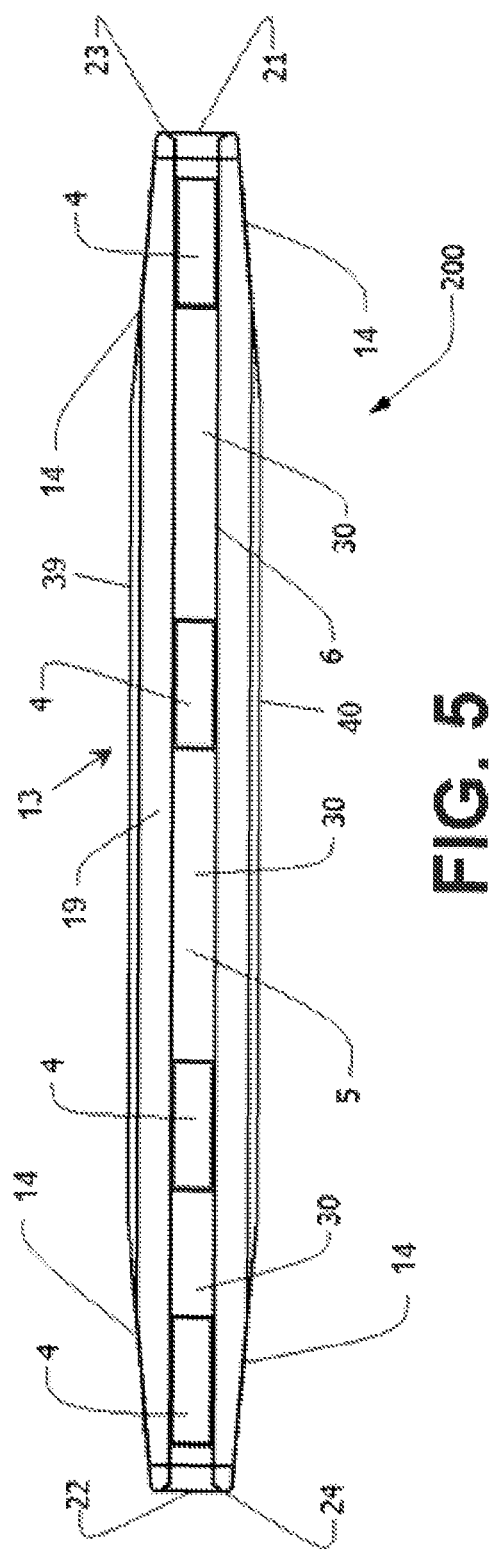
FIG. 5 is a bottom view of a magnetic leveling device in accordance with the disclosure.

FIG. 5 depicts the bottom working surface 19 of the leveling device 200. The channel 6 formed in the bottom working surface 19 of the body 13 contains an alternating arrangement of the rare earth magnets 4 and the spacers 30. The body 13 of the leveling device 200 includes beveling 14 which tapers the profile of the body 13 near both a front face 23 and a rear face 24 of the body 13 and on both the left side 39 and the right side 40 of the body 13. The front most spacer 21 is retained by the channel 6 near the front face 23 of the body 13 and the rearmost spacer 22 is retained by the channel 6 near the rear face 24 of the body 13.

Figure 6:
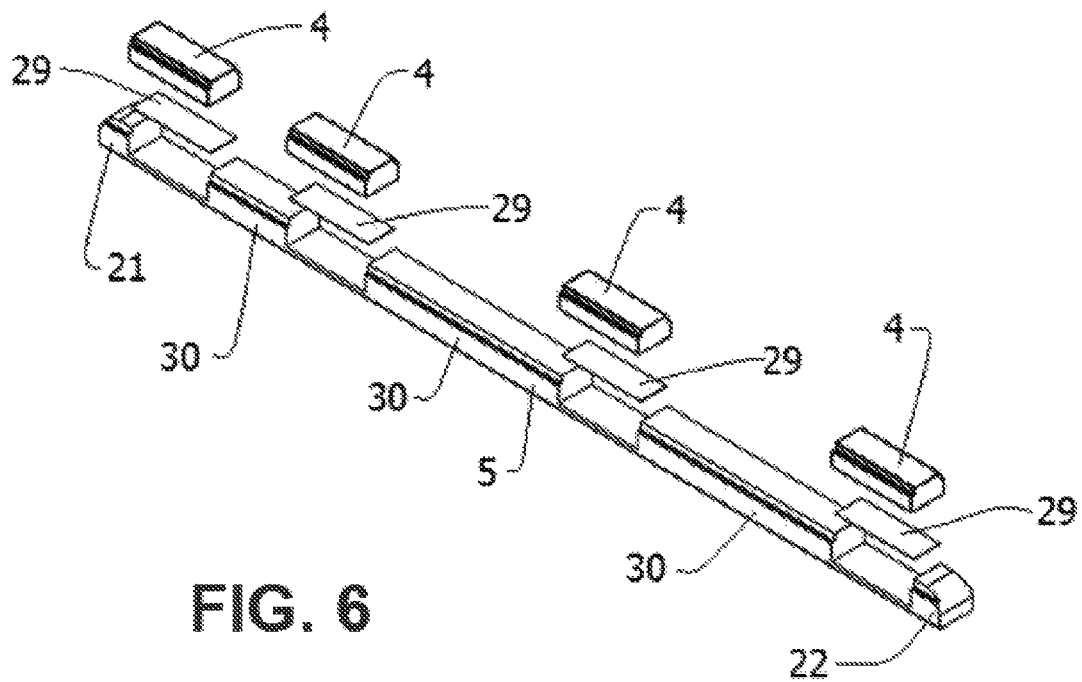
FIG. 6 is an embodiment of a magnet carrier in accordance with the disclosure.

FIG. 6 depicts an alternative embodiment of the disclosure. Here, the rare earth magnets 4 are placed on the magnet carrier 5 with double-sided adhesive foam strips 29 inserted between the rare earth magnets 4 and the magnet carrier 5. The double-sided adhesive foam strips 29 are configured to hold the rare earth magnets 4 securely to the magnet carrier 5 as well as to provide cushioning for the rare earth magnets 4 in the event of an impact. Spacers 30 are placed on the magnet carrier 5 between the rare earth magnets 4. The spacers 30 may be formed integrally with the magnet carrier 5 or as separate pieces that are inserted into the channel 6 on the body 13 in an alternating fashion with the magnets 4.

Figure 7:
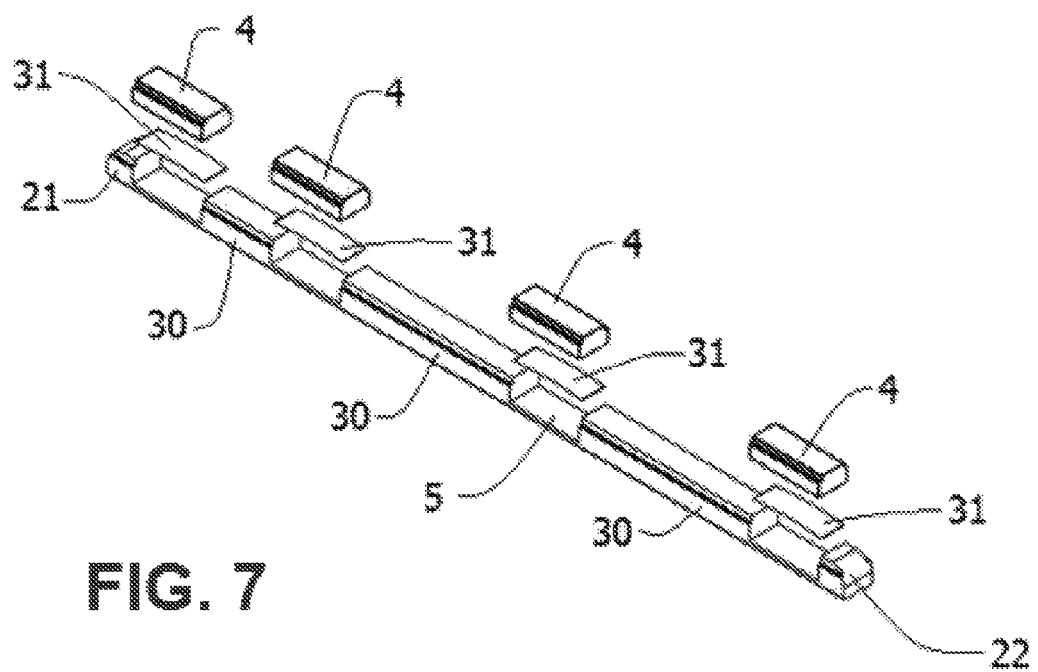
FIG. 7 is another embodiment of a magnet carrier in accordance with the disclosure.

FIG. 7 depicts another alternative embodiment of the disclosure. Here, the rare earth magnets 4 are placed on the magnet carrier 5 with curved metal springs 31 inserted between the rare earth magnets 4 and the magnet carrier 5. The curved metal springs 31 are configured to provide cushioning for the rare earth magnets 4 in the event of an impact.

FIG. 8 depicts an alternative embodiment of a leveling device 300. The leveling device 300 includes a bolt 33 and an anvil 34 near a rear face 41 of the leveling device 300. The bolt 33 and the anvil 34 are configured to clamp onto a pipe or conduit. The bolt 33 and the anvil 34 prevent the channel 6 from extending to the rear face 41 of the leveling device 300. Accordingly, the channel 6, near the rear face 41 of the leveling device 300, terminates in a U-shaped pocket 35 within the bottom working surface 19. The magnet carrier 5 in this embodiment is shaped with a U-shaped end 32 to conform with the U-shaped pocket 35. In addition, a rearmost spacer 42, is retained in the channel 6 and is shaped to conform with the U-shaped pocket 35.

We claim:

1. A leveling device, comprising:
a body having an elongated shape extending along a longitudinal axis, the body forming at least one opening extending through the body transversely relative to the longitudinal axis,
a leveling vial disposed in the at least one opening, and
at least one magnet disposed in a working surface of the body,
wherein the working surface includes a channel defined therein, the channel extending parallel with the longitudinal axis from a front face of the body and towards a rear face of the body, the channel containing the at least one magnet such that an exposed surface of the at least one magnet is parallel with the working surface, the at least one magnet having a length along the channel that is less than an overall length of the channel, and
at least one spacer disposed in the channel, the at least one spacer occupying an additional length of the channel along the longitudinal axis.

2. The leveling device of claim 1, wherein a plurality of magnets and spacers are disposed in the channel.

3. The leveling device of claim 1, wherein the spacer is formed on a magnet carrier that forms a pocket, into which the magnet is disposed, and wherein the magnet is insertable into the channel along with the magnet carrier while the magnet is disposed in the pocket.

4. The leveling device of claim 3, further comprising an adhesive disposed between the at least one magnet and the magnet carrier.

5. The leveling device of claim 3, wherein comprising a curved metal spring disposed between the at least one magnet and the magnet carrier.

6. The leveling device of claim 3, wherein the channel is open at one end of the body, and wherein the magnet carrier matingly engages a cross section of the channel such that the magnet carrier is insertable into the channel from the open end.

7. The leveling device of claim 1, wherein the exposed surface of the at least one magnet is recessed relative to the working surface.

8. The leveling device of claim 1, wherein the at least one magnet is generally shaped as a rectangular cuboid having two of its upper edges that extend parallel to the longitudinal axis of the body chamfered.

9. The leveling device of claim 8, wherein the channel forms a T shaped cross section forming indents that engage the upper edges of the at least one magnet to retain the at least one magnet into the channel.

10. The leveling device of claim 1, further comprising a plurality of magnets and spacers disposed in the channel in alternating fashion.

11. The leveling device of claim 1, wherein the body is made from extruded metal.

12. The leveling device of claim 1, wherein the channel extends along an entire length of the body.

13. The leveling device of claim 1, wherein the spacer is attached to the body.

14. A leveling device, comprising:
a body having an elongated shape extending along a longitudinal axis, the body forming at least one opening extending through the body transversely relative to the longitudinal axis,
a leveling vial disposed in the at least one opening,
a plurality of magnets associated with a working surface of the body,
wherein the working surface extends along the longitudinal axis and provides an engagement surface that is contoured to engage electrical conduit, the working surface including a channel defined therein, the channel extending parallel with the longitudinal axis from a front face of the body and towards a rear face of the body, the channel containing the plurality of magnets dispersed along a length of the channel such that an exposed surface of each of the plurality of magnets is parallel with at least a portion of the engagement surface, each of the plurality of magnets having a length along the channel that is less than an overall length of the channel, and
a plurality of spacers disposed in the channel, the plurality of spacers having an overall length that, together with an overall length of the plurality of magnets, occupy an entire length of the channel along the longitudinal axis.

15. The leveling device of claim 14, wherein the plurality of magnets and the plurality of spacers are disposed in alternating fashion in the channel.

16. The leveling device of claim 15, wherein the plurality of spacers is formed on a magnet carrier that forms a plurality of pockets disposed between adjacent spacers, wherein the plurality of magnets is disposed into the pockets and is insertable, along with the plurality of spacers and the magnet carrier, into the channel.

17. The leveling device of claim 16, further comprising a cushion, an adhesive or a spring disposed between at least one of the plurality of magnets and the magnet carrier at a corresponding pocket.

18. The leveling device of claim 16, wherein the channel is open at one end of the body, and wherein the magnet carrier has an elongate shape that matingly engages a cross section of the channel such that the magnet carrier is insertable into the channel from the open end.

19. The leveling device of claim 14, wherein the each of the plurality of magnets is generally shaped as a rectangular cuboid having two of its upper edges that extend parallel to the longitudinal axis of the body chamfered.

20. The leveling device of claim 19, wherein the channel forms a T shaped cross section forming indents that engage the upper edges of the plurality of magnets to retain the plurality of magnets in the channel.

* * * * *